United States Patent [19]

Kaneko et al.

[11] 4,396,972

[45] Aug. 2, 1983

[54] AIRPORT MARKER LIGHTING SYSTEM OF INSET TYPE AND METHOD OF MANUFACTURING THE SAME

[75] Inventors: Tadahiro Kaneko, Tokyo; Akihiro Kawauchi, Kawasaki; Toichi Shiratsuchi, Hino; Kiyoshi Suzuki, Yokohama, all of Japan

[73] Assignee: Toshiba Electric Equipment Corporation, Tokyo, Japan

[21] Appl. No.: 160,496

[22] Filed: Jun. 18, 1980

[30] Foreign Application Priority Data

Jun. 27, 1979 [JP] Japan .................................. 54/80960

[51] Int. Cl.³ ............................................... I21S 1/14
[52] U.S. Cl. ..................................... 362/145; 362/62; 362/184; 362/250
[58] Field of Search .................... 362/62, 95, 184, 250, 362/252, 145

[56] References Cited

U.S. PATENT DOCUMENTS

| | | | |
|---|---|---|---|
| 2,273,747 | 2/1942 | Adler, Jr. ........................... | 362/62 X |
| 2,794,967 | 6/1957 | Coggins et al. .................. | 362/234 X |
| 3,264,467 | 8/1966 | Mann et al. ......................... | 362/234 |
| 4,272,799 | 6/1981 | Downing ......................... | 362/184 X |

FOREIGN PATENT DOCUMENTS

2369159  6/1978  France ................................. 362/62

*Primary Examiner*—Peter A. Nelson
*Attorney, Agent, or Firm*—Oblon, Fisher, Spivak, McClelland & Maier

[57] ABSTRACT

An airport marker lighting system of an inset type that includes a lamp preparation step, a lamp housing preparation step and an assembling step. The first step prepares a plurality of different sorts of lamps of power consumption ratings and classes them into a plurality of groups. Each of the lamps have an identical base in size and the same distance between a position of a filament and a base. The second step prepares a plurality of different lamp housings having different outer diameter dimensions. The housing includes a base member and a cover section. The third step selects at least one of the lamps and one of the housings and mounts the selected lamp or lamps on the selected housing, and an airport marker lighting system manufactured by the method is also included.

7 Claims, 11 Drawing Figures

AIRPORT MARKER LIGHTING SYSTEM OF INSET TYPE AND METHOD OF MANUFACTURING THE SAME

FIELD OF THE INVENTION

This invention relates to a marker lighting system of different light intensities, which are of the inset type, i.e., buried in the airport ground for the purpose of preventing accidents at night or at the time of bad weather and a method of manufacturing the same. For the airport marker lighting system of the inset type, the color, minimum beam coverage, minimum average intensity of main beam, etc. corresponding to the "approach center line and cross bars", "approach side row", "threshold", "threshold wing bars", "touchdown zone", "runway center line", "runway edge" and "runway end" are recommended by International Civil Aviation Organization. The recommended values are listed in Tables 5-1 and 5-2 in the "International Standards and Recommended Practices, Aerodromes, Annex 14, to the Convention on International Civil Aviation", published by International Civil Aviation Organization.

DESCRIPTION OF THE PRIOR ART

The recommended value of the "minimum average intensity of main beam" for various prior art airport marker lighting systems of the inset type varies depending upon their use. Thus, the power consumptions of the lamps used for the lighting system vary with the lights for different uses belonging to the lighting system, and the lamps of different power consumption values have different outer dimensions. Also, the distance from the bottom surface of the socket to a position of the filament of the lamp varies with the lamps of different power consumptions. Further, the housing of the lamp and the reflector vary with the lights for different uses belonging to the lighting system, the lamps of which vary in outer dimensions and the aforementioned distance. Thus, the lamp housings and reflectors are lacking in interchangeability for various lighting systems for different uses. From these backgrounds, the manufacturers providing most or all of the lights belonging to the lighting system of the inset type have to produce and provide quality control of comparatively many different kinds of component parts and also provide inventory control of comparatively many different kinds of component parts. Furthermore, some sorts of the inset type lights belonging to the lighting system which are required in comparatively small quantities, for instance the "threshold", are comparatively high in cost compared to other varieties of lights belonging to the lighting system required in greater quantities because they are manufactured in comparatively small quantities.

SUMMARY OF THE INVENTION

An object of the invention is to provide an airport marker lighting system of inset type and a method of manufacturing the same, which can not only reduce cumbersome quality control and inventory control of parts by the manufacturer producing most or all of the various sorts of inset type lights belonging to the lighting system but can also permit manufacture of these lights belonging to the system at a reduced cost compared to the prior art.

BRIEF DESCRIPTION OF THE DRAWINGS

This invention can be more fully understood from the following detailed description when taken in conjunction with the accompanying drawings, in which.

DETAILED DESCRIPTION OF THE PREFERRED EMBODIMENTS

In one embodiment of the invention, a plurality of lamps with power consumption values ranging from about 30 W to about 400 W are classed into a first group consisting of lamps with power consumption values x ranging from not less than 250 to not more than 400 W (250 W $\leq$ x $\leq$ 400 W) and a second group of lamps with power consumption values x ranging from not less than 30 to less than 250 W (30 W $\leq$ x $<$ 250 W) in a lamp preparation step.

In this embodiment, the first grup consists of two sorts of lamps with power consumption values 250 W and 360 W. The second group consists of five sorts of lamps with power consumption values 35 W, 45 W, 65 W, 100 W and 200 W.

In this embodiment, all of the different sorts of lamps belonging to the aforementioned first or second group are halogen lamps provided with a base.

Figure 1:
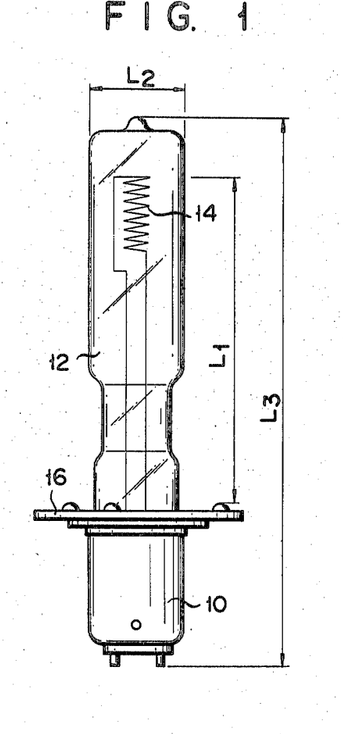
FIG. 1 is an elevational view showing a lamp belonging to a first group prepared in a lamp preparation step in one embodiment of the invention.
Figure 2:
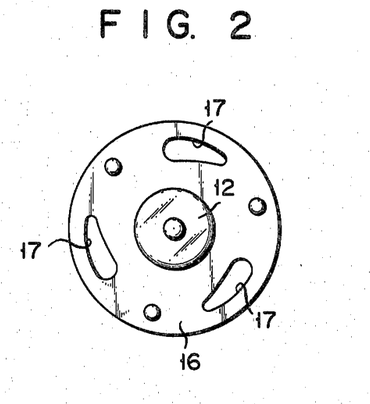
FIG. 2 is a plan view of the lamp shown in FIG. 2.

Two different sorts of lamps belonging to the first group are as shown in FIG. 1, comprising a base 10 and a tube member 12 made of glass and having an annular sectional profile. A filament 14 is disposed within the tube member 12. In this embodiment, the base 10 is provided on its side nearer the tube member 12 with a flange 16. As shown in FIG. 2, the flange 16 is formed with a plurality of circumferentially spaced-apart holes 17 in an arrangement concentric with the axis of the tube member 12. Each of these holes 17 extends in the circumferential direction, and its radial dimension is greater at its one end than and progressively reduced as one goes toward the other end.

As shown in FIG. 2, the tube side surface, or the upper surface of the flange 16 is formed with a plurality of projections projected from the surface in the direction of longitudinal axis of the tube member 12. With the two different sorts of lamps belonging to the first group, the dimensions and shape of the base 10, tube member 12 and flange 16 are the same. Also, with the two different sorts of lamps belonging to the first group, the radial distance of the plurality of holes 17 formed in the flange 16 from the aforementioned axis and their circumferential spacing and also the dimensions of the holes 17 are the same. Also, with the two different sorts of lamps belonging to the first group, the heights of the projections from the upper surface of the flange 16 are the same. Further, with the two different sorts of lamps belonging to the first group, the distance $L_1$ between the upper end of the filament 14 (which is the position of the filament in this embodiment) and the each upper ends of the projections of the flange 16 (see FIG. 1) is the same. In this embodiment, the distance $L_1$ is 42 mm. Also in this embodiment, the diameter $L_2$ of the tube member 12 of the two different sorts of lamps belonging to the first group (see FIG. 1) is 16 mm. Further in this embodiment, the dimension $L_3$ of the two different sorts of lamps belonging to the first group in the direction of the aforementioned axis (see FIG. 1) is 79 mm.

Figure 3:
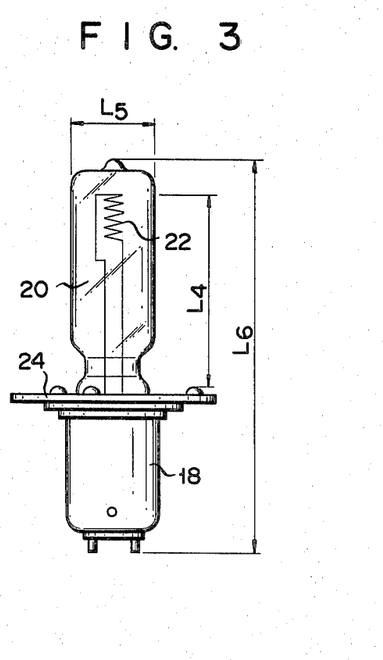
FIG. 3 is an elevational view showing a lamp belonging to a second group prepared in the lamp preparation step in one embodiment of the invention.
Figure 4:
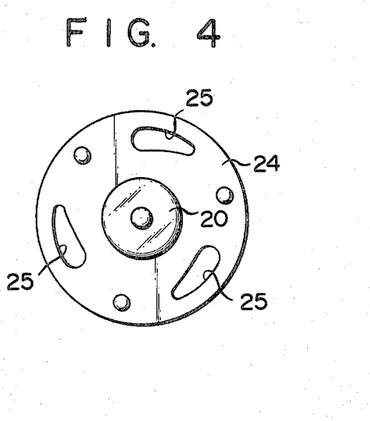
FIG. 4 is a plan view of the lamp shown in FIG. 3.

Four different sorts of lamps belonging to the second group are as shown in FIG. 3, comprising a base 18 and a tube member 20 made of glass and having an annular sectional profile. A filament 22 is disposed within the tube member 22. The base 18 is provided on its side nearer the tube member 20 with a flange 24. As shown in FIG. 4, the flange 24 is formed with a plurality of circumferentially spaced-apart holes 25 in an arrangement concentric with the axis of the tube member 20.

Each of these holes 25 extends in the circumferential direction, and its radial dimension is greater at its one end than and progressively reduced as one goes toward the other end. As shown in FIG. 4, the tube side surface, or the upper surface of the flange 24 is formed with a plurality of projections projected from the surface in the direction of longitudinal axis of the tube member 20. With the four different sorts of lamps belonging to the second group, the dimensions and shape of the base 18, tube member 20 and flange 24 are the same. Also with the four different sorts of lamps belonging to the second group, the radial distance of the plurality of holes 25 formed in the flange 24 and their circumferential spacing, and also the dimensions of the holes 25 are the same. Also, with the four different sorts of lamps belonging to the second group, the heights of the projection from the upper surface of the flange 24 are the same. Further, with the four different sorts of lamps belonging to the second group, the distance $L_4$ between the upper end of the filament 22 (which is the position of the filament in this embodiment) and the each upper ends of the projections of the flange 24 (see FIG. 3) is the same. In this embodiment, the distance $L_4$ is 25 mm. Also in this embodiment, the diameter $L_5$ of the tube member 20 of the four different sorts of lamps belonging to the second group (see FIG. 3) is 12 mm. Further in this embodiment, the dimension $L_6$ of the four different sorts of lamps belonging to the second group in the direction of the aforementioned axis (see FIG. 3) is 55 mm.

In this embodiment, the base 10 used for the two different sorts of lamps belonging to the first group and the base 18 used for the four different sorts of lamps belonging to the second group have the same dimensions and shape.

In one embodiment of the invention, a plurality of, or at least three, lamp housings which are different in the outer dimensions, comprising a base section and a cover section and for housing at least one of the six different sorts of lamps (of 45-W, 65-W, 100-W, 200-W, 250-W and 350-W ratings) belonging to the first or second group, are prepared in a lamp housing preparation step.

Figure 5:
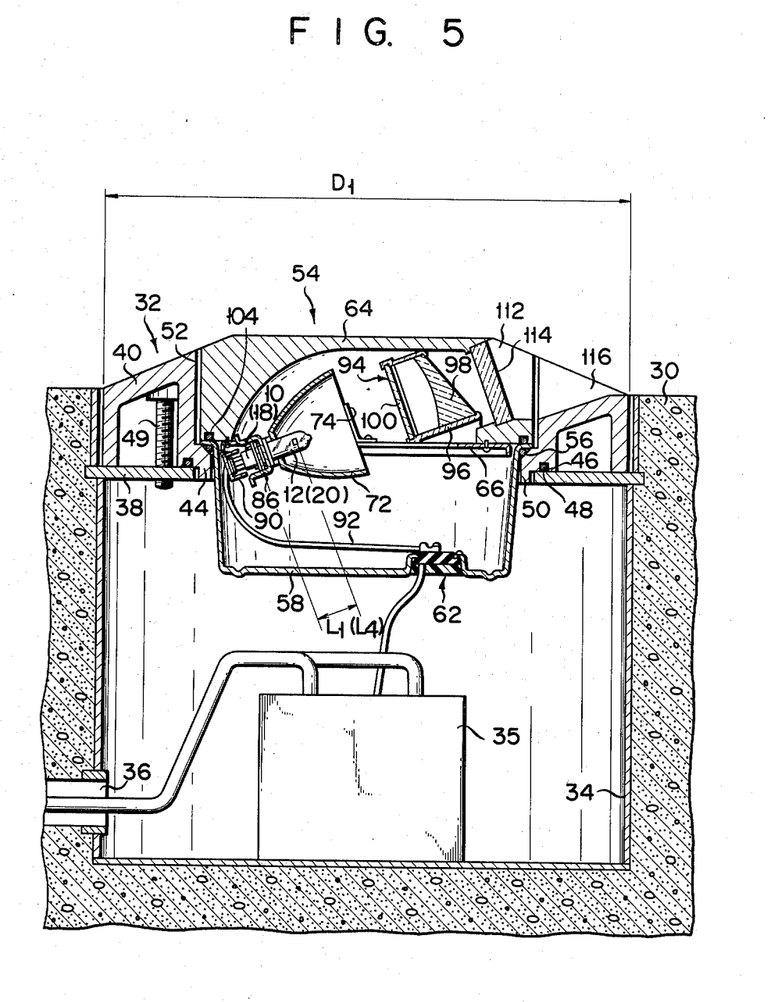
FIG. 5 is a sectional view showing an example of a lamp housing and lamp assembled in an assembling step in one embodiment of the invention.
Figure 6:
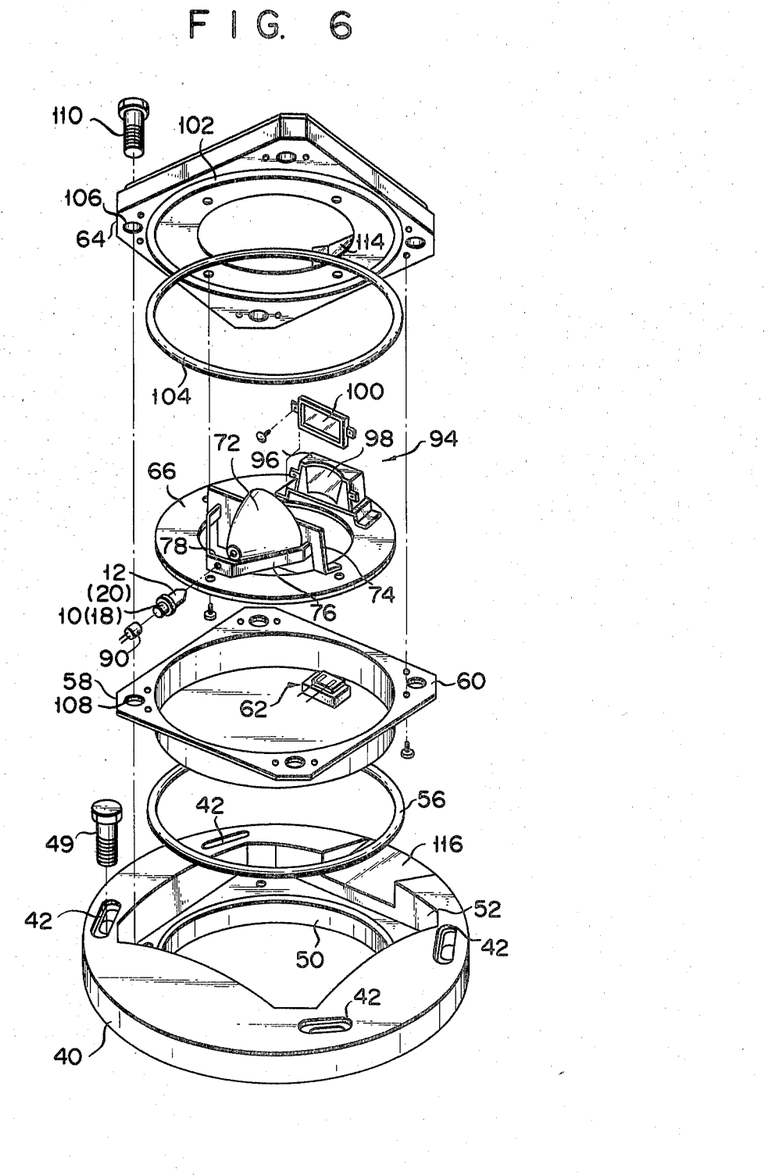
FIG. 6 is an exploded perspective view showing a holding member and cover section shown in FIG. 6.

Each lamp housing, as shown in FIG. 5, has a support section 32 which is shown burried in the ground of a runway 30. The support section 32 includes a cylindrical metal vessel 34, which is closed at the lower end. The metal vessel 34 accommodates a transformer 35, and its top is open to the surface of the runway 30. The peripheral wall of the metal vessel 34 is formed with a hole 36. Through the hole 36 a line for electrically connecting the transformer 35 and an external power source (not shown) is led. The metal vessel 34 has an inner flange 38 extending from its inner peripheral wall in the neighborhood of its top opening. The support section 32 also includes a substantially annular holding member 40 which is fitted in a portion of the peripheral wall of the metal vessel 34 adjacent to the top opening thereof. In this embodiment, the holding member 40 is a casting of iron, aluminum or the like. The holding member 40 has a tapered top of a convex sectional profile, and it is disposed such that the upper end of its outer periphery is flush with the runway surface and that the upper end of its inner periphery is raised relative to the runway surface. As is clearly shown in FIG. 6, the holding member 40 is formed with a plurality of vertical see-through holes 42 circumferentially spaced apart at a uniform internal. The dimension of each see-through hole in the circumferential direction is greater than its dimension in the radial dimension. As shown in FIG. 5, the holding member 40 has an annular projection 44 projecting from its bottom and engaging the inner periphery of the inner flange 38. Also, as shown in FIG. 5, the bottom of the holding member 40 which is in engagement with the inner flange 48 is formed with an annular groove 46 concentric with the annular projection 44. A first O-ring 48 is fitted in the annular groove 46 to seal the gap between the bottom of the holding member 40 and the inner flange 38 water-tight. The holding member 40 is screwed to the inner flange 38 by screws 49 inserted in the see-through holes 42. As shown in FIG. 6, the inner periphery of the holding member 40 is constituted by a first inner periphery surface 50 terminating in the bottom of the member and having a circular sectional profile and an upper second inner periphery surface 52 terminating in the top of the member and having a rectangular sectional profile. Each side of the second inner periphery surface 52 has a length greater than the diameter of the first inner periphery surface 50.

The corner of the shoulder between the first and second inner periphery surfaces 50 and 52 is chamfered, as shown in FIGS. 5 and 6, and a second O-ring 56 is fitted in the chamfer.

In this embodiment, the metal vessel 34 and holding member 40 constitute the support section 32.

Each lamp housing also comprises a cover section 54 mounted in the support section 32 as shown in FIG. 5. As shown in FIG. 5, in a space defined by the first inner periphery surface 52 a base member 58 is fitted. In this embodiment, the base member 58 constitutes a base section. The base member 58 has a cup-like shape and an outer flange 60 provided at the upper end of its peripheral wall. The outer flange 60 is in engagement with the shoulder surface between the first and second inner periphery surfaces 50 and 52. The second O-ring 56 is sealing the gap between the base member 58 and holding member 40 water-tight. The bottom wall of the base member 58 is provided with a connector 62, as shown in FIGS. 5 and 6. The converter 62 is electrically connected to the transformer 35.

As shown in FIGS. 5 and 6, the cover section 54 includes a dome-shaped member 64 fitted in a space defined by the second inner periphery surface 52 of the holding member 40. In this embodiment, the dome-shaped member 64 is a casting of iron, aluminum or the like. The top of the dome-shaped member 64 is machined such that its edge portion lies in the surface of taper of the tapered top of the holding member 40 and that its central portion is parallel with the surface of the runway 30. An annular plate-like member 66 having an outer diameter smaller than the inner periphery of the base member 38 is secured, for instance by screws, to the bottom surface of the dome-like member 64. The inner periphery of the annular plate-like member 66 has a diameter smaller than the diameter of the inner peripheral edge of the bottom surface of the dome-shaped member 64. A reflector mounting plate 74 carrying a substantially funnel-shaped reflector 72 is secured to the upper surface of the annular member 66 at a position between the inner periphery of the annular member 66 and the aforementioned inner peripheral edge of the dome-shaped member 64. A lamp mounting plate 76 is secured in the reflector mounting plate 74. The lamp mounting plate 76 has a central portion facing 78 a stem portion of the reflector 72.

Figure 7:
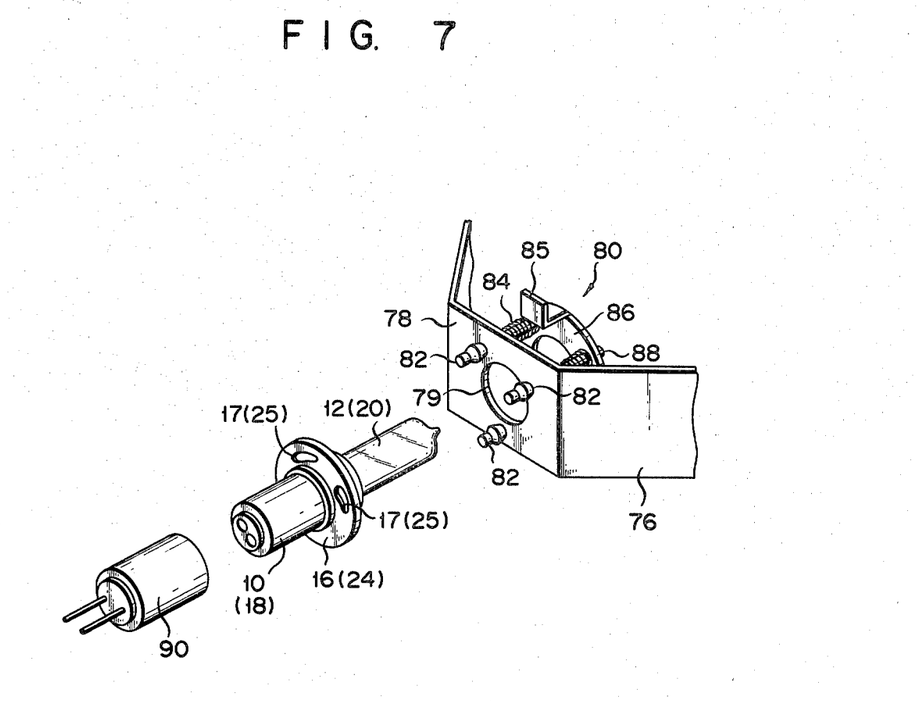
FIG. 7 is an enlarged-scale perspective view showing a central portion of a lamp mounting plate and a lamp holder shown in FIG. 6.

As clearly shown in FIG. 7, the central portion 78 is formed with an opening 79. In this embodiment, the opening 79 has a diameter which is greater than the diameter $L_2$ of the aforementioned two different sorts of lamps belonging to the first group and smaller than double the radial distance of each hole 17 formed in the flange 16 of these lamps from the aforementioned axis. Also, as clearly shown in FIG. 7, the central portion 78 is provided with a lamp holder 80. The lamp holder 82 is provided with a plurality of circumferentially spaced-apart lock pins 82 in an arrangement concentric with the opening 79 and penetrating the central portion 78. These lock pins 82 each have one end projecting from the surface of the central portion 78 on the side thereof not facing the reflector 72. This end has a diameter greater than that of the rest and smaller than the radial dimension of the aforementioned one end of the holes 17 of the flange 16 of the plurality of lamps belonging to the first and second groups. The diameter of the lock pin 82 other than the aforementioned one end is substantially the base as the radial dimension of the aforementioned other end of the holes 17 of the flange 16. The other end of each of the plurality of lock pins 82 is found on the side of the central portion 78 facing the reflector. A coil spring 84 is fitted on a portion of each lock pin 82 projecting from the surface of the central portion 78 on the side thereof facing the reflector. The aforementioned other end of each lock pin 82 penetrates a ring-like coupling plate 86 provided with an operating piece 85. The ring-like coupling plate 86 is secured to the lock pins 82 by nuts 88 screwed on the aforementioned other end of the respective lock pins 82, and it compresses the coil springs 84 in cooperation with the central portion 78. The inner periphery of the ring-like coupling plate 86 has a diameter greater than that of the opening 79. In the lamp holder 80, a lamp selected from the plurality of different sorts of lamps belonging to the first and second groups is mounted. When mounting the lamp, the tube member 12 or 20 is inserted through the opening 79 in the central portion 78, and the lock pins 82 are inserted through the holes 17 or 25 in the flange 16 or 24. Then, by turning the lamp in one direction the aforementioned one end of each of the plurality of the lock pins 82 is brought into engagement with the aforementioned other end of each of the plurality of the holes 17 or 25. At this time, the flange 16 or 24 is clamped between the aforementioned one end of the lock pins 82, which are biased by the coil springs 84 toward the reflector 72, and the central portion 78. Thus, there is no possibility that the lamp can be detached from the lamp holder 80. The upper ends of the projections of the flange 16 or 24 contact with the surface of the central portion 78 facing the reflector 72. The lamp may be removed from the lamp holder 80 by pulling the operating piece 85 to move the ring-like coupling plate 86 away from the reflector 72 against the biasing force of the coil spring 84 and then turning the lamp in the other direction.

The lamp mounted in the lamp holder 80 has a base 10 or 18 fitted in a lamp socket 90 as clearly shown in FIG. 5. The lamp socket 90 is electrically connected to the connector 62 by a lead 92.

As shown in FIGS. 5 and 6, a light control device 94 for controlling light projected from the lamp and reflected by the reflector 72 is secured to the upper side of the annular member 66 between the inner periphery thereof and the afore-mentioned inner peripheral edge of the dome-like member 64. The light control device 94 is disposed such that it crosses the axis of the lamp. The light control device 94 has a housing 96 provided with a pair of mounting portions which are in contact with the upper surface of the annular member 66. Each of the mounting portions is formed with a slit (not shown) parallel to the axis of the lamp. The housing 96 is secured to the annular member 66 by screws (not shown) inserted in the slits. As shown in FIGS. 5 and 6, the light control device 94 includes a prism 98 for controlling the beam angle of the light projected from the lamp and a filter 100 secured to the housing 96 by means of screws. The filter 100 is selected from three diffferent filters, namely green, red and transparent filters, depending upon the use of the lights belonging to the lighting system.

The bottom of the dome-like member 64 in contact with the outer flange 60 of the base member 58 is formed with an annular groove 102, as clearly shown in FIG. 6. As clearly shown in FIG. 5, a third O-ring 104 is fitted in the annular groove 102. The outer flange 60 of the base member 58 is secured to the bottom of the dome-shaped member 64 by means of screws. The third O-ring 104 seals the gap between the bottom of the dome-shaped member 64 and the outer flange 60 so as to be water-tight.

As shown in FIG. 6, the dome-shaped member 64 is formed adjacent to its four corners with vertically see-through holes 106. The outer flange 60 of the cup-shaped member 58 is also formed at positions corresponding to the see-through holes 106 with respective see-through holes 108. The dome-shaped member 64 is secured to the holding member 40 by bolts 110 inserted in the see-through holes 106 and 108.

In this embodiment, the dome-shaped member 64 and annular member 66 constitute the cover section 54.

In this embodiment, the dome-shaped member 64 is formed with an opening 112 such that the opening 112 crosses the afore-mentioned axis of the lamp, as clearly shown in FIG. 5. A transparent glass plate 114 is fitted in the opening 112 in a water-tight fashion. The top of the holding member 40 is formed at a position corresponding to the opening 112 in the dome-shaped member 64 with a light projection guide groove 116, as shown in FIGS. 5 and 6.

In the lamp housing of this embodiment, having the above construction comprising the support section 32, the cover section 34 and the base member 58, first, second and third holding members 40 having different diameters $D_1$ are prepared for the support section 32. In this embodiment, the diameter $D_1$ are 400, 300 and 200 mm.

Also in this embodiment, first, second and third dome-shaped members 64 of different length dimensions of the sides individually corresponding to the respective first, second and third holding members 40 having the different diameters $D_1$ are prepared for the cover section 34 in the lamp housing preparation step.

Figure 8:
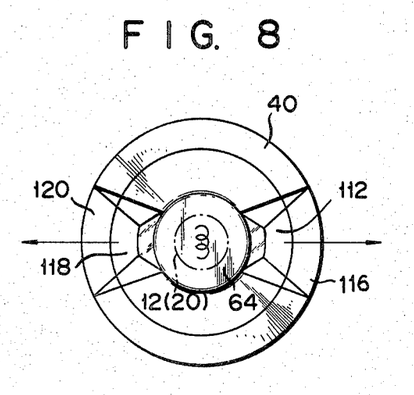
FIG. 8 is a schematic plan view showing a second set as for the combination of holding member and dome-shaped member and a second set for the combination of base member and annular member prepared in the lamp housing preparation step in one embodiment of the invention.

In the lamp housing preparation step of this embodiment, a first set consisting of one light projection guide opening 112 and one light projection guide groove 116, as shown in FIGS. 5 and 6, is provided for the combination of the first holding member 40 having the largest diameter $D_1$ and the first dome-shaped member 64 having the largest length of the sides corresponding to the first dome-shaped member 64. Also, for the combination of the first holding member 40 and first dome-shaped member 64 a second set consisting of a first light projection guide opening 112 and a first projection guide groove 116 and a second light projection guide opening 118 and a second light projection groove 120, the second light projection guide opening and guide being spaced apart 180° from the first opening and groove, as shown in FIG. 8, is prepared. Light projected though the second light projection guide opening 118 and second light projection guide groove 120 is at an angle of 180° with respect to the light projected through the first light projection guide opening 112 and first light projection guide groove 116.

Figure 9:
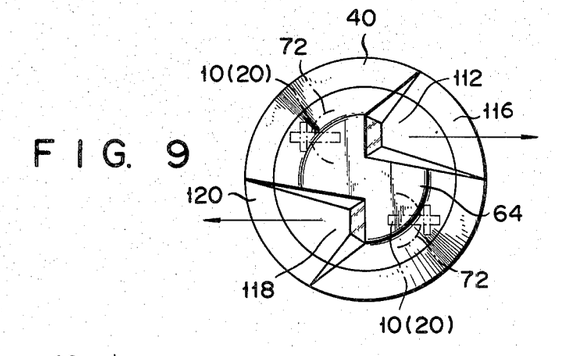
FIG. 9 is a schematic plan view showing a third set as for the combination of holding member and dome-shaped member and a third set for the combination of base member and annular member prepared in the lamp housing preparation step in one embodiment of the invention.

Also, in the lamp housing preparation step of this embodiment, for the combination of the second holding member 40 having the second largest diameter $D_1$ and the second dome-shaped member 64 having the second largest length of the sides corresponding to the second holding member the first set as shown in FIGS. 5 and 6 and the second set as shown in FIG. 8 are prepared similar to the case of the combination of the first holding member 40 and first dome-shaped member 64. Also, for the combination of the second holding member 40 and second dome-shaped member 64 a set consisting of a first light projection guide opening 112 and a first light projection guide groove 116 and a second light projection guide opening 118 and a second light projection guide groove 120, the first light projection guide opening and groove being disposed with respect to the second opening and groove such that light projected through the first opening and groove is parallel to but opposite in direction to light projected through the second opening and groove, as shown in FIG. 9, is prepared.

Figure 10:
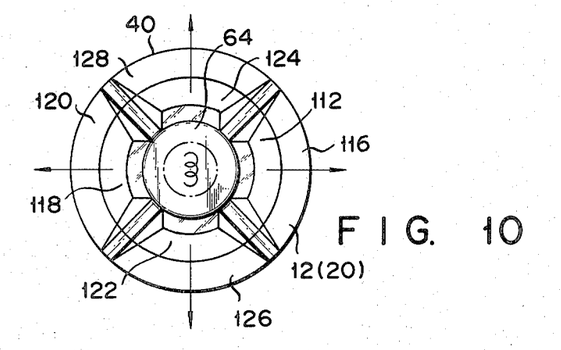
FIG. 10 is a schematic plan view showing a fourth set as for the combination of holding member and dome-shaped member and a fourth set for the combination of base member and annular member prepared in the lamp housing preparation step in one embodiment of the invention.

Further, in the lamp housing preparation step of this embodiment, for the combination of the third holding member 40 having the third largest diameter $D_1$ and the third dome-shaped member 64 having the third largest length of the sides corresponding to the third holding member the second set as shown in FIG. 8 is prepared similar to the case of the combination of the first holding member 40 and first dome-shaped member 64. Also, for the combination of the third holding member 40 and third dome-shaped member 64 a fourth set consisting of first to fourth light projection guide openings 112, 118, 122 and 124 and first to fourth projection guide grooves 116, 120, 126 and 128, these opening and grooves being disposed to project light in four, uniformly spaced-apart directions, as shown in FIG. 10, is prepared.

Further in the lamp housing preparation step of this embodiment, first, second and third base members 58 having different inner diameters corresponding to the first, second and third holding members 40 are prepared for the base section.

Further in the lamp housing preparation step of this embodiment, first, second and third annular members 66 having different diameters corresponding to the first, second and third holding members 40 are prepared for the cover section 54.

In the lamp preparation step of this embodiment, the first annular member 66 having the largest outer diameter a first set consisting of one reflector 72 and one light control device 94, as shown in FIG. 6, is prepared. Also, for the first annular member 66 a second set consisting of a lamp mounting plate for disposing the tube member 12 or 20 of the lamp along the axis of the dome-shaped member 64 and a pair of light control devices 94, as shown in FIG. 8, is prepared.

For the second annular member 66 having the second largest diameter, the first and second sets regarding the light control device 94 and lamp are prepared similar to the case of the first annular member 66. Also, for the second annular member 66 a third set consisting of two reflectors 72 and two light control devices 94, as shown in FIG. 9, is prepared.

For the third annular member 66 the third largest outer diameter the second set regarding the light control device 94 and lamp as shown in FIG. 8 is prepared. Also, for the third annular member 66 a fourth set consisting of a lamp holder plate for disposing the tube member 12 or 20 of the lamp along the axis of the dome-shaped member 64 and four light control devices 94, as shown in FIG. 10, is prepared.

In one embodiment of the invention, in an assembling step the first set as for the combination of the first holding member 40 and first dome-shaped member 64 and the first set as for the combination of the first base member 58 and first annular member 66 are used to produce a lamp housing of a first type. This lamp housing of the first type uses one lamp belonging to the first group and of a power consumption rating of 350 W.

Also, in the assembling step of this embodiment, the second set as for the combination of the first holding member 40 and first dome-shaped member 64 and the second set as for the combination of the first base member 58 and first annular member 66 are used to produce a lamp housing of a second type. This lamp housing of the second type uses one lamp belonging to the first group and of a power consumption rating of 250 W.

Further, in the assembling step of this embodiment, the first set as for the combination of the second holding member 40 and second dome-shaped member 64 and the first set as for the combination of the second base member 66 and second annular member 66 are used to produce a lamp housing of a third type. This lamp housing of the third type uses one lamp selected from three different lamps belonging to the second group and of respective power consumption ratings of 65, 100 and 200 W.

Further in the assembling step of this embodiment, the second set as for the combination of the second holding member 40 and second dome-shaped member 64 and the second set as for the combination of the second base member 58 and second annular member 66 are used to produce a lamp housing of a fourth type. This lamp housing of the fourth type uses one lamp belonging to the second group and of a power consumption rating of 200 W.

Further in the assembling step of this embodiment, the third set as for the combination of the second holding member and second dome-shaped member 64 and the third set as for the combination of the second base member 58 and second annular member 66 are used to produce a lamp housing of a fifth type. This lamp housing of the fifth type uses two lamps of either one of the two different sorts belonging to the second group and of power consumption ratings of 65 and 100 W.

Further in the assembling step of this embodiment, the second set as for the combination of the third holding member 40 and third dome-shaped member 64 and the second set as for the combination of the third base member 58 and third annular member 66 are used to produce a lamp housing of a sixth type. This lamp housing of the sixth type uses one lamp selected from the three different sorts of lamps belonging to the second group and of respective power consumption ratings of 45, 65 and 100 W.

Further in the assembling step of this embodiment, the fourth set as for the combination of the third holding member 40 and third dome-shaped member 64 and the fourth set as for the combination of the third base member 58 and third annular member 66 are used to produce a lamp housing of a seventh type. This lamp housing of the seventh type uses one lamp selected from the two different sorts of bulbs belonging to the second group and of respective power consumption ratings of 45 and 65 W.

In one embodiment of the invention, in the assembling step the light control device or devices 94 and the reflector 92 with the annular member 66 secured thereto are secured to the dome-shaped member 64. Then, a lamp of a predetermined rating is mounted in the lamp holder 80, and then the lamp socket 90 which is already electrically connected to the connector 62 which is already electrically connected to the transformer 35 is mounted in the base 10 or 18 of the lamp. Subsequently, the dome-shaped member 64 is secured to the base member 58, and then the dome-shaped member 64 is fitted in the space defined by the second inner periphery 52 of the holding member 40 and secured thereto by the bolts 110.

The Table below lists the uses of various lights belonging to the lighting system of the inset type having the lamp housings of the first to seventh types assembled in the assembling step mentioned above.

TABLE

| Diameter of holding member $D_1$ | Type of lamp housing | Lamp Group | Power consumption | Optical system | Use (Symbol) |
|---|---|---|---|---|---|
| 400 mm | 1 | 1 | 350 W | One lamp, illumination in one direction | Approach center line, threshold (HU) |
|  | 2 | 1 | 250 W | One lamp, illumination in two directions | Approach siderow runway threshold, runway end (HB) |
| 300 mm | 3 | 2 | 65 W, 100 W, 200 W | One lamp, illumination in one direction | Stop line, touchdown zone, taxiway edge (MU) |
|  | 4 | 2 | 200 W | One lamp, illumination in two directions | Runway center line, taxiway center line (MB) |
|  | 5 | 2 | 65 W, 100 W | Two lamps, illumination in two directions | Runway center line, taxiway center line (MW) |
| 200 mm | 6 | 2 | 45 W, 65 W, 100 W | One lamp, illumination in two directions | Taxiway center line (LB) |
|  | 7 | 2 | 35 W, 45 W 65 W | One lamp, illumination in four directions | Taxiway edge (LO) |

As is shown in the Table above, most of the inset type airport marker lighting system provided with the lamp housings of the various types can be used for a plurality of different uses. Also, marker lighting system of some types can use a plurality of lamps of different power consumption ratings. Thus, since the number of component parts can be reduced compared to the prior-art light belonging to the lighting system, it is possible to reduce the cumbersomeness of the quality control and inventory control of parts by the manufacturer producing most or all of the various lights belonging to the lighting system. Further, since a number of different purposes can be met by a comparatively small number of different types, it is possible to increase the scale of production of the lights belonging to the lighting system of each type compared to the case of the prior art, thus permitting reduction of the cost of manufacture of various lights belonging to the lighting system of the inset type.

Figure 11:
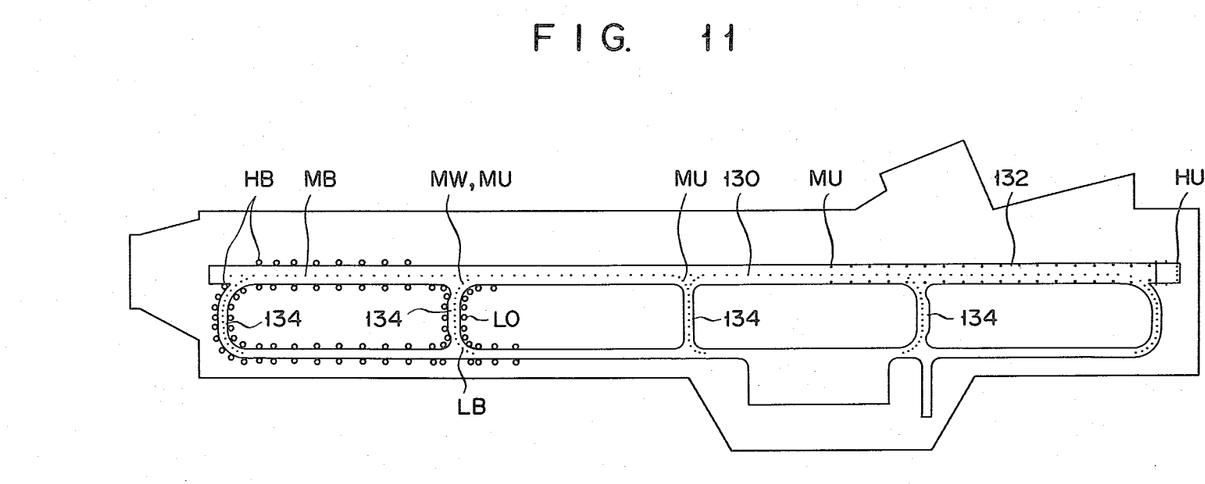
FIG. 11 is a plan view of an airport utilizing with the lighting system in one embodiment of the invention.

FIG. 11 shows an airport which is applied with the airport marker lighting system in one embodiment of this invention. The airport has a runway 130, an approach way 132 and a plurality of taxiways 134.

The predetermined places as to the runway 130, the approach way 132 and the taxiways 134, as shown in FIG. 1, are applied with various airport marker lighting systems designated by the symbol of the table.

As has been described in the foregoing, the airport marker lighting system of the inset type according to the invention comprises a plurality of different sorts of lamps of power consumption ratings ranging between about 30 W and about 400 W which are classed into a plurality of groups, the aforesaid plurality of different sorts of lamps belonging to one of the plurality of groups having an identical base in size and the same distance between a position of a filament of each lamp and the base, a plurality of different lamp housings having at least three different outer diameter dimensions, each of the lamp housings including a base section and a cover section and being accommodating at least one lamp of the plurality of different sorts of lamps belonging to the plurality of groups. Thus, according to the invention it is not only possible to reduce the cumbersome nature of quality control and inventory control of parts by the manufacturer producing most or all of the various lights belonging to the lighting system of the inset type but also permit manufacture of airport marker lighting systems of the inset type at a reduced cost compared to the case of the prior art.

In the airport marker lighting system of the inset type according to the invention, it is preferable to class the afore-mentioned plurality of different sorts of lamps with power consumption ratings ranging between about 30 W and about 400 W into a first group consisting of lamps of a plurality of different sorts of lamps with power consumption ratings ranging between not less than 250 W and not more than 400 W and a second group consisting of lamps of a plurality of different sorts of lamps with power consumption ratings ranging between not less than 30 W and less than 250 W.

In the airport marker lighting system of the inset type according to the invention, the aforementioned second group consists of four different sorts of lamps of respective power consumption ratings of 45, 65, 100 and 200 W, and the aforementioned first group consists of two different sorts of lamps of respective power consumption ratings of 250 and 350 W.

Further, in the airport marker lighting system according to the invention in the same bases in size are preferably used for six sorts of lamps belonging to two groups.

Moreover, in the airport marker lighting system of the inset type it is preferable that each different lamp housing includes a cover section having an opening for projecting light in one direction.

Further, in the airport marker lighting system of the inset type it is preferable that the first cover section includes a light control means for regulating the beam angle of light projected through the opening of the aforementioned cover section and also giving a color to the light projected through the opening in the cover section.

Also, in the airport marker lighting system of the inset type it is preferable that each different lamp housing includes a second cover section having two openings for projecting respective light beams having the same light axis in opposite directions.

Further, in the airport marker lighting system of the inset type it is preferable that the second cover section includes a light control means for regulating the same angle of light projected through the two openings of the aforementioned second cover section and also giving a color to the light projected through the openings in the second cover section.

Additionally, in the airport marker lighting system of the inset type it is preferable that each different lamp housing includes a third cover section having two openings for projecting respective light beams having parallel axes in opposite directions.

Further, in the airport marker lighting system of the inset type it is preferable that the third cover section includes a light control means for regulating the beam angle of light projected through the two openings of the aforementioned third cover section and also giving a color to the light projected through the two openings in the third cover section.

In addition, in the airport marker lighting system of the inset type it is preferable that each different lamp housing includes a fourth cover section having openings for projecting respective light beams, two of these light beams having the same axis but projected in opposite directions and other two of these light beams having the same axis perpendicular to the aforementioned axis but projected in opposite directions.

Further, in the airport marker lighting system of the insert type it is preferable that the fourth cover section includes a light control means for regulating the beam angle of light projected through the openings of the afore-mentioned fourth cover section and also giving a color to the light projected through these openings in the fourth cover section.

It is to be understood that the afore-mentioned embodiment is only illustrative and by no means intended to constitute limits of the invention, and various changes and modifications can be made in technical details without departing from the scope and spirit of the invention.

What is claimed as new and desired to be secured by Letters Patent of the United States is:

1. An airport marker lighting system for use in an airport having an approach way, runway and a taxiway, said system comprising:

a plurality of approach lights, runway lights, touchdown lights and taxiway lights, each of which further comprises a plurality of housings each having a housing body which is buried in the ground with one open end located substantially flush with the ground surface and which each further comprises holding means and a dome-shaped cover which covers the open end of the housing body and which each includes a light projecting section for containing an optical system; and a plurality of lamps held in the holding means, respectively, of each of housings and which each further comprise a filament, a tubular member containing said filament with a first end thereof being closed, a single ended base fixed to a second end of the tubular member and a flange member attached to the single-ended base for positioning each lamp in cooperation with the holding means of each housing body, wherein said housings further comprise a first, second and a third housing each having cross sections of different sizes and each having a socket of the same type; wherein said lamps further comprise a first and second group of lamps wherein the first group further comprises a plurality of lamps of different types of power consumption values ranging from 250 W to 400 W and the second group further comprises a plurality of lamps of different types of power consumption ranging from 30 W to less than 250 W such that in the lamps of said first group the distance between the flange and the upper end of the filament is substantially the same, in the lamps of said second group the distance between the flange and the upper end of the filament is substantially the same and shorter than said distance in the lamps of said first group and wherein said approach lamps each comprise a housing of largest size and at least one lamp from said first group;

said runway lights each comprise a housing of the largest or next to largest size and at least one lamp selected from said second group;

said touchdown lights each comprise a housing of the second largest size and at least one lamp from said second group; and said taxiway lights each comprise a housing of the second or third largest size and at least one lamp from said second group.

2. An airport marker lighting system according to claim 1, wherein the lamps of said first group have power consumption values of 250 W and 350 W, and the lamps of said second group have power consumption values of 35 W, 45 W, 65 W, 100 W and 200 W.

3. An airport marker lighting system according to claim 2, wherein said lights further comprise means for indicating an approach center line, an approach threshold end and an approach siderow, said runway lights further comprise means for indicating a runway threshold and a runway end, said touchdown lights further comprise means for indicating a touchdown zone, and said taxiway lights further comprise means for indicating a stop line, taxing edge and a taxiway center line.

4. An airport maker lighting system according to claim 3, wherein said housings of the largest size each further comprise an additional cover having a light projecting section, the housings of the second largest size each further comprise an additional cover having a light projecting section and an additional socket, and the housings of smallest size each further comprise an additional cover having a light projecting section and a first, second and third additional cover, each of said approach center line lights and approach threshold lights has a housing of the largest size and a 350 W-lamp;

each of said approach siderow lights, runway threshold lights and runway end lights has a housing of the largest size having a cover with two light projecting sections and a 250 W-lamp;

each of the taxiway stop line lights and touchdown lights further comprise a housing of the second largest size and one one lamp of a 65 W-lamp, a 100 W-lamp or a 200 W-lamp type;

said taxiway edge light further comprises a housing of the second largest size and either a 65 W-lamp, a 100 W-lamp or a 200 W-lamp;

said runway center line light further comprises a housing of the second largest size having a housing body with one socket and a cover with two light projecting sections and one 200 W-lamp; and said taxiway center line light further comprises a housing of the second largest sizse having a housing body with one socket and a cover with two light projecting sections and one 200 W-lamp.

5. An airport maker lighting system according to claim 3, wherein said housings of the largest size each further comprise an additional cover having a light projecting section, the housings of the second largest size each further comprise an additional cover having a light projecting section and an additional socket, and the housings of smallest size each further comprise an additional cover having a light projecting section and a first, second and third additional cover, each of said approach center line lights and approach threshold lights has a housing of the largest size and a 350 W-lamp;

each of said approach siderow lights, runway threshold lights and runway end lights has a housing of the largest size having a cover with two light projecting sections and a 250 W-lamp;

each of the taxiway stop line lights and touchdown lights further comprise a housing of the second largest size and one one lamp of a 65 W-lamp, a 100 W-lamp or a 200 W-lamp type;

said taxiway edge light further comprises a housing of the smallest size having a housing body with one socket and a cover with four light projecting sections and one lamp of a 35 W-lamp, a 45 W-lamp or a 65 W-lamp type;

said runway center line light further comprises a housing of the second largest size having a housing body with two sockets and one cover with two light projecting sections and one lamp of a 65 W-lamp or a 100 W-lamp type; and said taxiway center line light further comprises a housing of the second largest size having a housing body with two sockets and one cover with two light projecting sections and one lamp of a 65 W-lamp or a 100 W-lamp type.

6. An airport maker lighting system according to claim 3, wherein said housings of the largest size each further comprise an additional cover having a light projecting section, the housings of the second largest size each further comprise an additional cover having a light projecting section and an additional socket, and the housings of smallest size each further comprise an additional cover having a light projecting section and a first, second and third additional cover, each of said approach center line lights and approach threshold lights has a housing of the largest size and a 350 W-lamp;

each of said approach siderow lights, runway threshold lights and runway end lights has a housing of the largest size having a cover with two light projecting sections and a 250 W-lamp;

each of the taxiway stop line lights and touchdown lights further comprise a housing of the second largest size and one one lamp of a 65 W-lamp, a 100 W-lamp or a 200 W-lamp type;

said taxiway edge light further comprises a housing of the second largest size and either a 65 W-lamp, a 100 W-lamp or a 200 W-lamp;

said runway center line light further comprises a housing of the second largest size having a housing body with one socket and a cover with two light projecting sections and one 200 W-lamp; and said taxiway center line light further comprises a housing of the smallest size having a housing body with one socket and one cover with two light projecting sections and one lamp of a 45 W-lamp, a 65 W-lamp or a 100 W-lamp type.

7. An airport maker lighting system according to claim 3, wherein said housings of the largest size each further comprise an additional cover having a light projecting section, the housings of the second largest size each further comprise an additional cover having a light projecting section and an additional socket, and the housings of smallest size each further comprise an additional cover having a light projecting section and a first, second and third additional cover,
- each of said approach center line lights and approach threshold lights has a housing of the largest size and a 350 W-lamp;
- each of said approach siderow lights, runway threshold lights and runway end lights has a housing of the largest size having a cover with two light projecting sections and a 250 W-lamp;
- each of the taxiway stop line lights and touchdown lights further comprise a housing of the second largest size and one one lamp of a 65 W-lamp, a 100 W-lamp or a 200 W-lamp type;
- said taxiway edge light further comprises a housing of the smallest size having a housing body with one socket and a cover with four light projecting sections and one lamp of a 35 W-lamp, a 45 W-lamp or a 65 W-lamp type;
- said runway center line light further comprises a housing of the second largest size having a housing body with two sockets and one cover with two light projecting sections and one lamp of a 65 W-lamp or a 100 W-lamp type;
- said taxiway center line light further comprises a housing of the smallest size having a housing body with one socket and one cover with two light projecting sections and one lamp of a 45 W-lamp, a 65 W-lamp or a 100 W-lamp type.

* * * * *